United States Patent [19]

Yoshida et al.

[11] Patent Number: 5,409,041
[45] Date of Patent: Apr. 25, 1995

[54] LAMINATED SHEET

[75] Inventors: Minoru Yoshida, Fujisawa; Masatoshi Nakamizo, Ogasa, both of Japan

[73] Assignee: NOK Corporation, Tokyo, Japan

[21] Appl. No.: 944,750

[22] Filed: Sep. 14, 1992

Related U.S. Application Data

[62] Division of Ser. No. 705,616, May 29, 1991, abandoned.

[30] Foreign Application Priority Data

May 31, 1990 [JP] Japan ................... 2-142686
Sep. 7, 1990 [JP] Japan ................... 2-237897

[51] Int. Cl.$^6$ ............................................. F15B 1/047
[52] U.S. Cl. ...................................... 138/30; 428/518
[58] Field of Search .................. 138/30, 125; 220/530, 220/720, 721; 428/492, 494, 520, 521, 522, 516, 904.4, 518

[56] References Cited

U.S. PATENT DOCUMENTS

| | | | |
|---|---|---|---|
| 2,391,986 | 1/1946 | Leach | 428/492 |
| 2,564,602 | 8/1951 | Hurst | 138/125 |
| 2,800,145 | 7/1957 | Peierls | 138/125 |
| 3,442,293 | 5/1969 | Erdmann | 138/30 |
| 3,515,616 | 6/1970 | Miyamoto | 428/494 |
| 4,082,854 | 4/1978 | Yamada | 428/521 |
| 4,244,914 | 1/1981 | Ranalli et al. | |
| 4,254,169 | 3/1991 | Schroeder | 428/518 |
| 4,278,716 | 7/1981 | Buchner | 428/521 |
| 4,332,858 | 6/1982 | Saitoh et al. | |
| 4,361,608 | 11/1982 | Furukawa | 428/521 |
| 4,407,881 | 10/1983 | Shima | 428/904.4 |
| 4,464,443 | 8/1984 | Farrell | 428/518 |
| 4,543,997 | 10/1985 | Kishimoto | 138/30 |
| 4,559,266 | 12/1985 | Misasa | 428/518 |
| 4,572,854 | 2/1986 | Dallman | 428/518 |
| 4,634,395 | 1/1987 | Burchett | 428/492 |
| 4,804,584 | 2/1989 | Nakashima | 428/522 |
| 4,806,351 | 2/1989 | Sugimoto | 428/522 |
| 4,847,148 | 7/1989 | Schirmer | 428/521 |
| 4,948,671 | 8/1990 | Hattori | 428/516 |
| 4,971,864 | 11/1990 | McCord | 428/520 |
| 5,004,647 | 4/1991 | Shah | 428/521 |
| 5,054,373 | 10/1991 | Brault | 138/30 |
| 5,062,455 | 11/1991 | Schurter | 138/30 |
| 5,215,124 | 6/1993 | Hattori et al. | 138/30 |

FOREIGN PATENT DOCUMENTS

| | | | |
|---|---|---|---|
| 686817 | 5/1964 | Canada | 428/518 |
| 360648 | 3/1990 | European Pat. Off. | 138/30 |
| 2151371 | 4/1973 | France . | |
| 2341433 | 9/1977 | France . | |
| 2445223 | 7/1980 | France . | |
| 2603075 | 2/1988 | France . | |
| 2628795 | 9/1989 | France . | |
| 20354 | 2/1982 | Japan | 428/521 |
| 203041 | 11/1983 | Japan | 428/521 |
| 1030901 | 2/1989 | Japan | 138/30 |
| 2165948 | 6/1990 | Japan | 428/494 |
| 774722 | 5/1957 | United Kingdom | 428/492 |
| 8401127 | 3/1984 | WIPO | 428/492 |

Primary Examiner—Timothy F. Simone
Assistant Examiner—Terrence R. Till
Attorney, Agent, or Firm—Jacobson, Price, Holman & Stern

[57] ABSTRACT

An accumulator including a shell (1) divided into a gas chamber (a) and a fluid inflow chamber (b) by a bladder (32) made of a cold-resistant and gas-barrier laminated sheet which includes a polyvinyl alcohol type resin film (20) containing a polyol type plasticizer in an amount of 15% to 50% by weight, a rubber sheet layer (21) laminated at least one side of the polyvinyl alcohol type resin film and a film (23) disposed therebetween of a non-vapor- and non-plasticizer-permeable resin film.

12 Claims, 3 Drawing Sheets

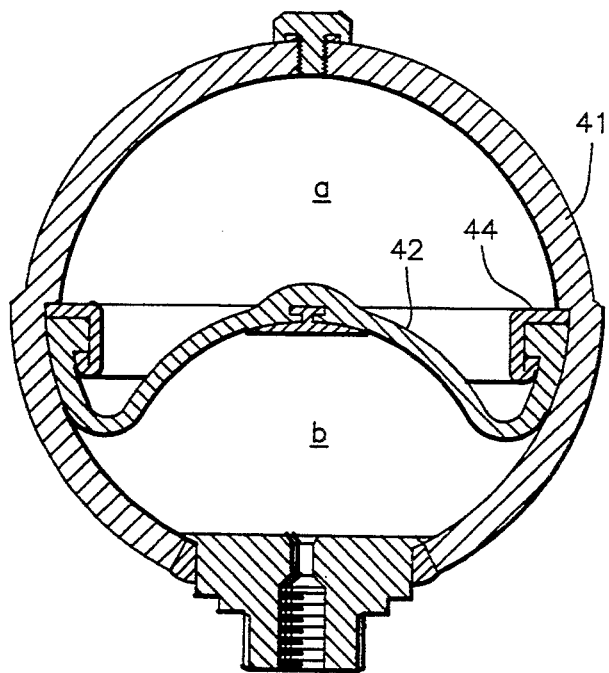
FIG. 5
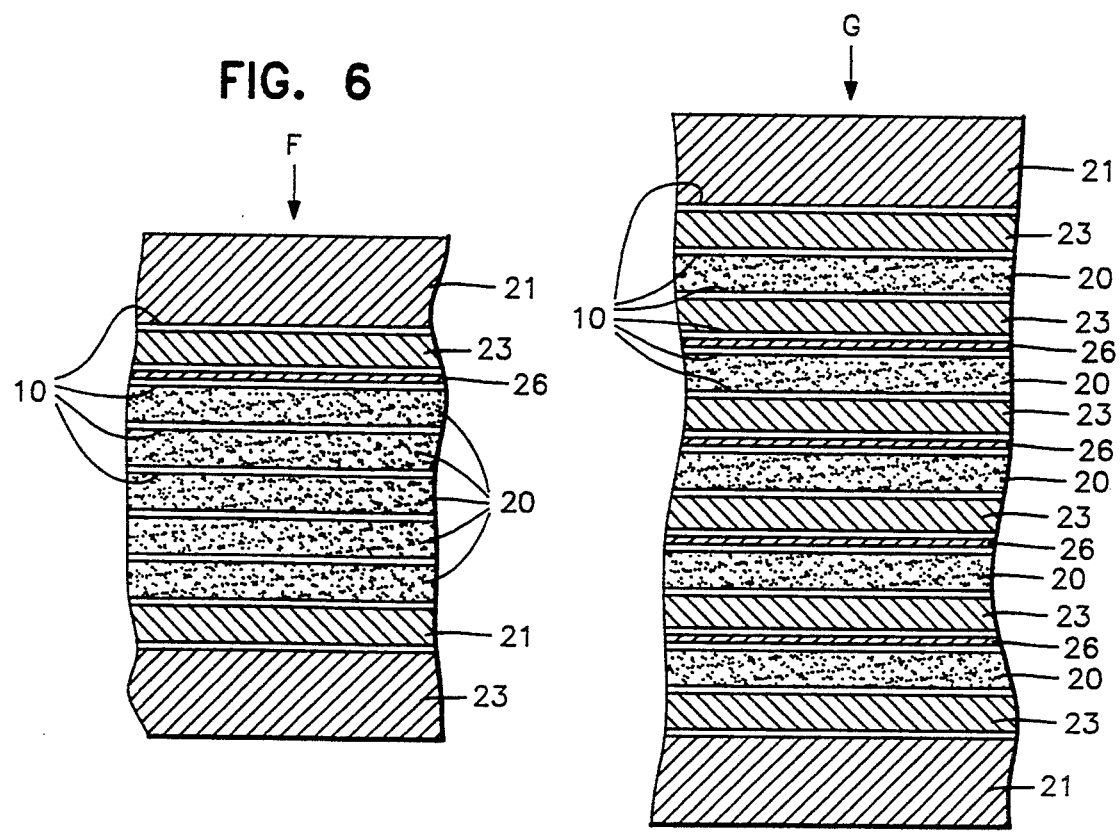
FIG. 6
FIG. 7

LAMINATED SHEET

This is a DIVISIONAL of application Ser. No. 07/705,616, filed May 29, 1991 which was abandoned upon the filing hereof.

BACKGROUND OF THE INVENTION

The present invention relates to a cold-resistant and gas-barrier laminated sheet and, more particularly, to a bladder comprising a cold-resistant and gas-barrier laminated sheet so adapted as to be employed in an accumulator where a large degree of deformation occurs.

PRIOR ART

FIG. 5 shows a conventional accumulator for absorbing pulsating fluid flow. The accumulator includes a spherical shell 41 and a bladder 42 attached to the inside of the shell 41 so as to define two chambers a, b therein. The bladder 42 is composed of rubber or other elastic material and mounted on the inside of the shell 41 by means of a ring-shaped holder 44. The chamber a positioned at the upperside of the shell 41 serves as a gas chamber with gases filled through a gas inlet. The chamber b positioned at the lower side thereof serves as a fluid inflow chamber.

As the bladder 42 is made of a material such as rubber having gas permeability, the gas penetrates through the bladder 42 so that the pressure in the gas chamber a remarkably decreases during use over a long period of time. As a result, the fluid pressure control cannot be performed in a stable condition.

In a conventional diaphragm, a gas-barrier sheet is employed where deformation is caused to occur to a great extent. Such a gas barrier sheet is composed of high gas-barrier films in the form of a laminated sheet. Such a gas-barrier sheet, however, is poorer in flexibility than rubber. There are many occasions where it is damaged particularly under low temperatures.

SUMMARY OF THE INVENTION

Therefore, an object of the present invention is to provide a laminated sheet in which cold resistance is improved without substantially decreasing its gas-barrier performance.

It is a further object of the present invention to provide an accumulator in which gas can be prevented from penetrating through a bladder to a remarkable extent so that the pressure loss in a gas chamber can be effectively avoided over a long period of time.

According to the present invention, a cold-resistant and gas-barrier laminated sheet comprises a polyvinyl alcohol type resin film containing a polyol type plasticizer in an amount from 15% to 50% by weight, and an elastic sheet such as a rubber sheet laminated on at least one side of the polyvinyl alcohol type resin film.

Examples of the polyvinyl alcohol type (hereinafter PVA) resin film are films composed of a completely saponified polyvinyl acetate, a partially saponified are films composed of completely or partially saponified polyvinyl acetate or a saponified ethylene-vinyl acetate copolymer.

According to the present invention, such a resin film contains a polyol such as glycerine, ethylene glycol, propylene glycol, etc., in an amount rate of from about 15% to 50% by weight, preferably from approximately 20% to 40% by weight. If the amount of the polyol would be lesser than the lower limit, on the one hand, the resulting film may become poorer in elongation and cold resistance. If the amount of the polyol would exceed the upper limit, on the other hand, gas barrier performance of the resulting polyvinyl alcohol type resin film may be reduced.

Examples of the rubber sheet are nitrile rubber, butyl rubber, chloroprene rubber, styrene rubber, or the like.

According to an embodiment of the present invention, the cold-resistant and gas-barrier laminated sheet basically comprises: the polyvinyl alcohol type resin film layer having a thickness of approximately from 50 to 2,000 micron meters and containing the polyol type plasticizer; and the rubber sheet layer laminated on one side of the resin film and having a thickness of approximately from 0.2 to 2 mm. In another embodiment of the inventor a non-vapor- and non-plasticizer-permeable resin film having a thickness of approximately 5 to 50 micron meters is interposed between the polyvinyl alcohol type resin film and the rubber sheet, in order to prevent the plasticizer from blooming due to absorption of moisture by the polyvinyl alcohol type resin film containing the polyol type plasticizer in an amount of approximately 20% by weight or higher, and/or in order to prevent migration or volatilization of the plasticizer during use at high temperatures.

Examples of the non-vapor- and non-plasticizer-permeable resin film are films of polyethylene, polypropylene, polyvinyl fluoride, polyvinylidene fluoride, ethylene tetrafluoride-propylene hexafluoride copolymer, polyol type plasticizer-free and saponified ethylene-vinyl acetate copolymer, etc. In particular, the fluorine resin type films and polyol type plasticizer-free and saponified ethylene-vinyl acetate copolymer films have their excellent gas-barrier performance.

According to another embodiment of the present invention, a metal-deposited film such as aluminum-deposited film is formed on one side of the non-vapor- and non-plasticizer-permeable resin film in such a manner that the metal-deposited film faces the side of the polyvinyl alcohol type resin film. Thus, the non-vapor- and non-plasticizer-permeable resin film can compensate for reduction in the gas barrier performance of the polyvinyl alcohol type resin film caused to be reduced by contamination of the plasticizer.

The lamination between the rubber sheet and each of the films may be performed by means of vulcanization adhesion by using a vulcanizable rubber compound as an adhesive or performed by using agglomerating adhesive such as chloroprene. The non-vapor- and non-plasticizer-permeable resin film may be laminated with each of the layers by using a heat seal or an adhesive. If the resin film has a low adhesion as in the case of polyethylene or fluoride resin, it is preferably laminated after its adhesion has been improved by treatment of both sides of the resin film with corona discharging or vapor deposition.

In bonding the polyvinyl alcohol type resin film containing the plasticizer, an adhesive of an isocyanate type is generally empolyed. When such an adhesive is used in an alkaline liquid or an acidic liquid such as braking liquid, or under water, or under high temperature conditions, the urethane linkage may be broken thereby to cause separation of the adhesive. When the non-vapor- and non-plasticizer-permeable resin film layer is disposed, it can serve as a protective film, thereby preventing such foreign material from penetrating and exhibiting the effect of extending the adhesion life.

According to the present invention, as the rubber sheet layer and the polyvinyl alcohol type resin film containing the polyol type plasticizer are laminated so as to form a laminated sheet, it can improve its cold resistance to a remarkable extent without causing any substantial reduction in the gas barrier performance possessed in nature by the gas barrier film. Hence, the cold-resistant and gas-barrier laminated sheet can effectively be employed as a laminated sheet applicable even at low temperatures in a place at which deformation is caused to occur largely, such as a diaphragm.

The present invention may be directed to a bladder to be employed in the manner as described hereinabove. Due to such a laminated structure that the resin layer having non-gas permeability is laminated with an elastic layer composed of rubber, etc., penetration of gases in a gas chamber of the bladder can be suppressed to a remarkable extent, thereby enabling initial performance to be maintained over a long period of time.

It is also to be noted that the resin layer is composed of the polyvinyl alcohol type resin containing the polyol type plasticizer in an amount from 15% to 50% by weight, so that penetration of gases can be suppressed to a remarkably large extent and the plasticizer contained therein can provide the material with flexibility, thereby improving elongation and cold resistance.

Further, the resin layer composed of the polyvinyl alcohol type resin is laminated with the non-plasticizer-permeable resin film, so that blooming of the plasticizer can be suppressed, thereby possessing the effect of maintaining elongation and cold resistance over the long period of time.

BRIEF DESCRIPTION OF THE DRAWINGS

The invention will now be described in detail with reference to the accompanying drawings, wherein

FIG. 5 is a cross sectional view showing a conventional bladder type of accumulator; and FIGS. 6 and 7 are schematic partial cross-sectional views showing further embodiments of the invention.

DESCRIPTION OF THE PREFERRED EMBODIMENTS

Figure 1:
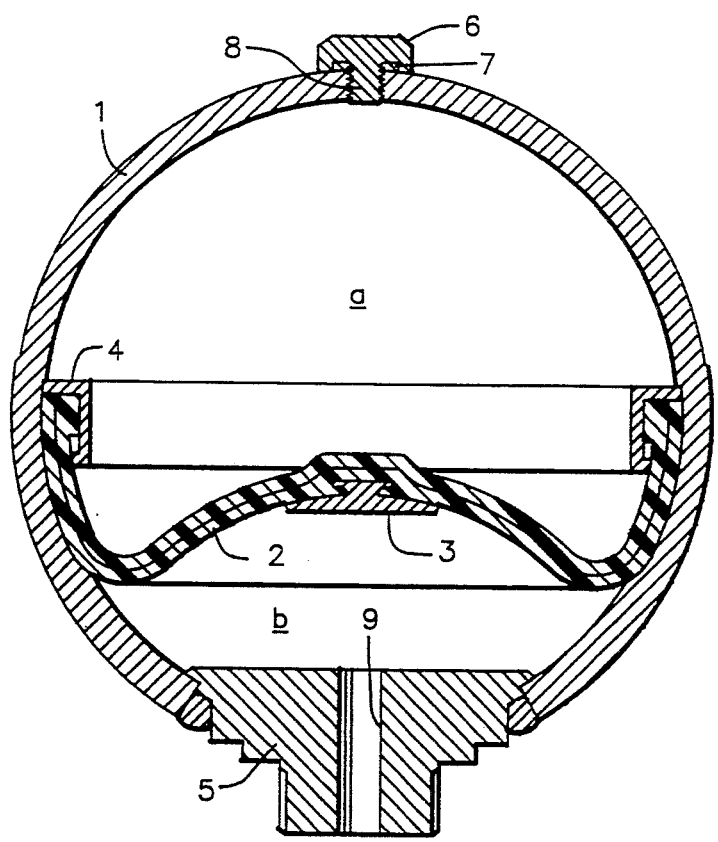
FIG. 1 is a cross sectional view showing an outline of an accumulator according to an embodiment of the present invention.

FIG. 1 shows an overall outline of an accumulator equipped with a bladder in which a laminated sheet according to the present invention is used.

In the accumulator, a spherical shell 1 has a gas inlet 8 in which a gas plug 6 is disposed through an O-ring 7. A bladder 2 is mounted on the inside of the shell 1 through a ring-shaped holder 4 so as to define two chambers a and b. The chamber a positioned at the side of a gas inlet 8 serves as a gas chamber with gases filled through the gas inlet 8, while the chamber b positioned at the opposite side thereof serves as a fluid inflow chamber. To the chamber b is mounted an oil port 5 having a fluid conduit 9.

A poppet 3 is mounted at a middle portion of the bottom face of the bladder 2 for opening or closing the fluid conduit 9.

Figure 2:
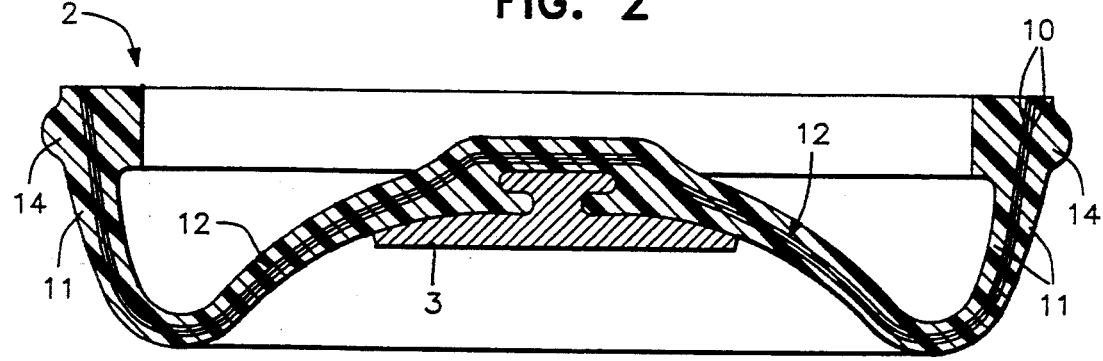
FIG. 2 is an enlarged cross sectional view showing an outline of a bladder employed in the accumulator according to the FIG. 1 embodiment of the present invention.

As illustrated in FIG. 2, the bladder 2 comprises a resin layer 12 having non-gas permeability and an elastic layer 11 composed of rubber and laminated on at least one side of the resin layer 12. In the embodiment of FIGS. 1 and 2, such an elastic layer 11 is laminated on each side of the resin layer 12 through an adhesive 10. The elastic layer 11 laminated on the side of the fluid conduit 9 has a small projection 14 in a semi-spherical form or the like along an outer peripheral portion thereof near its upper edge when no pressure is applied onto the projection 14. When the projection 14 is pressed between the holder 4 and the shell 1 as shown in FIG. 1, thereby allowing the projection 14 to seal the gases within the gas chamber a, no leakage of the gases filled in the gas chamber a takes place through an interface between an inner surface of the shell 1 and an abutment portion of the bladder 2.

The elastic layer 11 disposed at the side of the inflow chamber b is utilized to be equipped integrally with the projection 14 for sealing the gases. In this case, the elastic layer 11 is required to be laminated on the resin layer 12 at the side of the inflow chamber b but not at the side of the gas chamber a.

Examples of a non-gas permeable resin for forming the resin layer are polyvinylidene chloride, polyvinylidene fluoride, polyvinyl alcohol type resin or the like. A polyvinyl alcohol type resin is employed for the bladder 2 employed in the illustrated embodiment in order to obtain the best results in view of the characteristics required for the bladder, such as heat resistance, moldability, etc.

In order to provide the polyvinyl alcohol type resin with elongation and cold resistance, the polyol type plasticizer such as glycerin, ethylene glycol, etc. may be contained therein at amount usually from 15% to 50% by weight, preferably from 20% to 50% by weight. If the rate of the polyol type plasticizer would be less than the lower limit, elongation and cold resistance may become poorer in a certain circumstance. If the rate thereof would exceed the upper limit, the non-gas permeability of the polyvinyl alcohol type resin may be damaged.

The elastic layer 11 composed of rubber may consist of nitrile rubber, butyl rubber and/or styrene rubber.

In the embodiment of FIGS. 1 and 2, the bladder 2 basically comprises the polyvinyl alcohol type resin film layer 12 having a thickness of approximately from 300 micron meters to 1,500 micron meters containing the polyol type plasticizer and the elastic layer 11 laminated on each side thereof and having a film thickness of from approximately 0.2 mm to 2 mm and composed of rubber. Although not shown in FIG. 2, the non-plasticizer permeable resin film having a thickness of from approximately 5 microns to 50 microns i s interposed between the polyvinyl alcohol type resin layer 12 and each of the elastic layers 11 composed of rubber. Thus, the plasticizer can be prevented from blooming due to absorption of moisture by the polyvinyl alcohol type resin film containing the polyol type plasticizer in an amount of approximately 20% by weight. Also, migration or volatilization of the plasticizer can be avoided during use at high temperatures.

The non-plasticizer-permeable resin film is a fluorine resin type film or an ethylene-vinyl alcohol type resin film due to their high non-gas permeability although it can be any film made of polyethylene, polypropylene, polyvinyl fluoride, polyvinylidene fluoride, ethylene tetrafluoride-propylene hexafluoride copolymer, plasticizer-free and saponified ethylene-vinyl acetate copolymer, etc.

The lamination between the layers 11, 12 is performed by means of vulcanization adhesion by using a vulcanizable rubber compound as an adhesive 10 or performed by using agglomerating adhesive such as chloroprene, etc.

Figure 3:
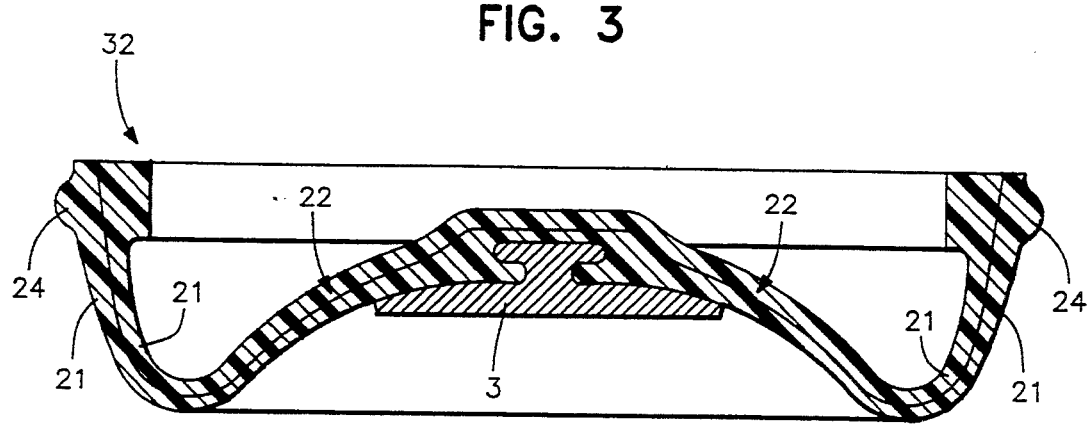
FIG. 3 is a cross sectional view showing an outline of a bladder according to another embodiment of the present invention.
Figure 4:
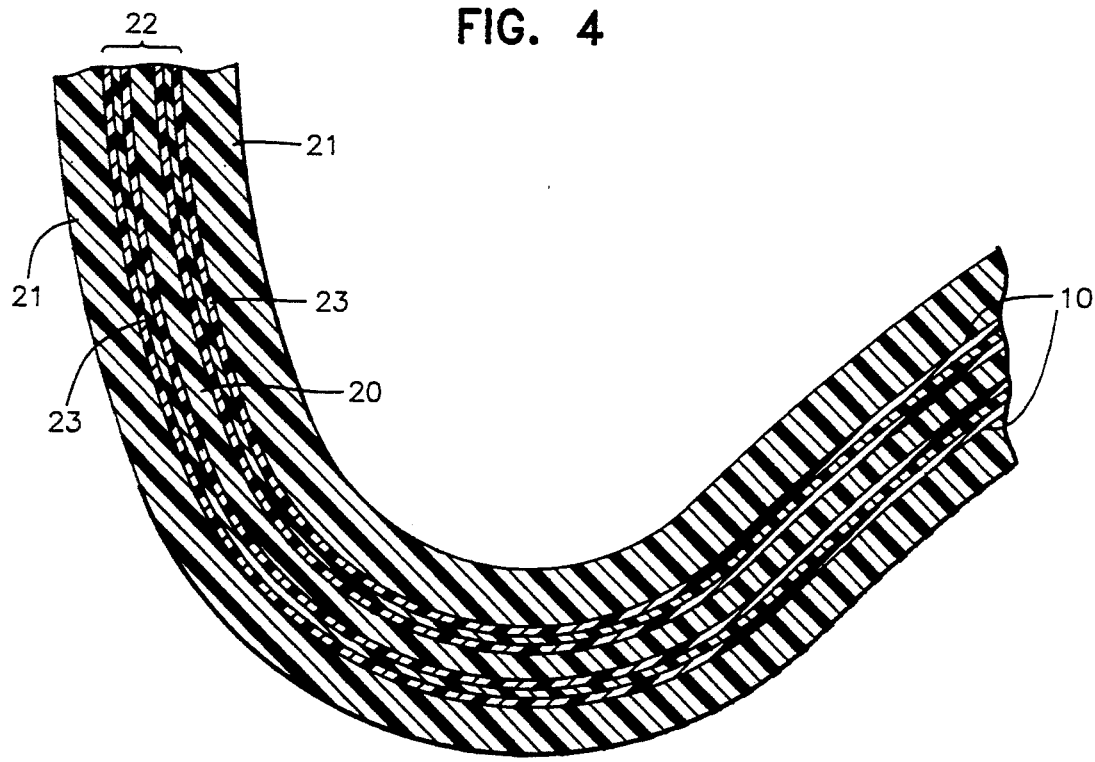
FIG. 4 is an enlarged cross sectional view showing a portion of the bladder shown in FIG. 3.

FIGS. 3 and 4 show another embodiment of the present invention in which a bladder 32 is employed in an accumulator. The accumulator has substantially the same construction as in the embodiment of FIGS. 1 and 2 except the bladder 32. Description of the shell and other elements or portions of the accumulator will be omitted herefrom accordingly.

In the embodiment of FIGS. 3 and 4, the bladder 32 comprises a single polyvinyl alcohol type resin film 20 containing the polyol type plasticizer in an amount from 15% to 50% by weight, two elastic films 21 composed of rubber, and two resin films 23 each having a non-plasticizer-permeability. A resin layer 22 is formed by laminating the two resin films 23 on both sides of the polyvinyl alcohol type resin film 20. The elastic films 21 are laminated on both sides of the resin layer 22. Each of the layers 20, 21, 23 is laminated with each other through an adhesive 10.

As shown in FIG. 3, a projection 24 formed integral with an outer periphery of the elastic layer 21 near its upper edge is so disposed as to obtain a complete seal between the shell and the elastic layer 21 positioned at the inflow chamber side as in the embodiment of FIGS. 1 and 2. For such a reason, the elastic layer 21 is laminated on the resin layer 22 at least at the side of the fluid inflow chamber.

The gas chamber a (FIG. 1) is of a closed system formed by the shell, bladder, gas plug and so on in such a manner that blooming of the plasticizer into the gas chamber a can be supressed within a certain constant amount, but the fluid inflow chamber b is of such an open system that a fluid can flow in or out continuously. Hence, the blooming of the plasticizer can effectively be suppressed if the resin film 23 having the non-plasticizer-permeability is laminated on the polyvinyl alcohol type resin film 20 at least at the side of the fluid inflow chamber b.

Experiment 1

Description will now be made of the experimental results for a bladder employed in an accumulator according to a preferred embodiment of the present invention. The construction of the bladders B-I to B-V tested was as follows:

B-I. A butyl rubber sheet having a thickness of 0.5 mm to 1.5 mm was bonded by vulcanization onto each side of a polyvinyl alcohol film having a film thickness of 650 microns and containing glycerin in an amount of 10% by weight, whereby a laminated sheet is formed as shown in FIG. 1.

B-II. The same as B-I above, except for the content of glycerin in the polyvinyl alcohol in an amount of 20% by weight.

B-III. The same as B-I above, except for the content of glycerin in the polyvinyl alcohol in an amount of 30% by weight.

B-IV. The same as B-I above, except for the content of glycerin in the polyvinyl alcohol in an amount of 40% by weight.

B-V. The same as B-IV above, with the exception that a saponified, plasticizer-free ethylene-vinyl acetate copolymer film having a film thickness of 25 microns is bonded by vulcanization to each side of the polyvinyl alcohol film.

| Construction of Bladder | Experimental Results | |
|---|---|---|
| | Ratio of Transmission Coefficient | Average Number of Fractures ($\times 10^4$) |
| B-I | 0.05 | <1 |
| B-II | 0.07 | 1 to 2 |
| B-III | 0.08 | 2 |
| B-IV | 0.1 | 5 |
| B-V | 0.1 | >10 |
| B-VI | 1.0 | >10 |

In the above results, reference symbol B-VI denotes a bladder composed solely of butyl rubber and having the same thickness and surface area as the bladders of reference symbols B-I to B-V. The ratio of transmission coefficient is rated when nitrogen gas transmission of the butyl rubber only is set to 1.

The average number of fractures is a value when nitrogen gas flow into the gas chamber in a state that the bladder is incorporated into the accumulator and the gas chamber is allowed to stand at 100° C. for 70 hours in a state that braking oil is filled in the fluid inflow chamber, followed by causing braking oil to flow out and in at −40° C. so as to give a compression ratio within the range from 2 to 3 which is a ratio of the pressure of the braking oil to the pressure at which nitrogen gas is filled.

Experiment 2

The following PVA films I to IV having a degree of polymerization of 1,700, a degree of saponification of 99% or higher and a film thickness of 65 microns were used:
 I: Content of glycerin: 20% by weight
 II: Content of glycerin: 30% by weight
 III: Content of glycerin: 40% by weight
 IV: Content of glycerin: 10% by weight The protective film a composed of PP film (TOCELO RXC3; product of Tokyo Cellophane Papers K.K.) having a thickness of 50 microns was treated on both sides with corona discharging. The protective film b composed of ethylene tetrafluoride-propylene hexafluoride copolymer film (NEOFLON FEP; product of Daikin K.K.) having a thickness of 50 microns was treated on its both sides with corona discharging.

The rubber sheet having a thickness of 1 mm and consisting of the following components was bonded by vulcanization by using an adhesive (Chemlok 250; product by Lord Corporation):
 butyl rubber (Butyl 365; made by Nippon Gosei Gomu K.K.) 100 parts by weight
 carbon black (Seast SO; Tokai Carbon K.K.) 70 parts by weight
 sulfur 1 part by weight
 zinc oxide 5 parts by weight
 antioxidant (TT) 2 parts by weight Various laminated sheets A through H were produced by using the above-stated materials as follows:
 Laminated sheet A: rubber sheet/I/rubber sheet
 Laminated sheet B: rubber sheet/a/I/a/rubber sheet Laminated sheet C: rubber sheet/a/II/a/rubber sheet
Laminated sheet D: rubber sheet/a/A1 deposited (500 Å)/II/a/rubber sheet
Laminated sheet E: rubber sheet/b/I/b/rubber sheet
Laminated sheet F: rubber sheet/b/A1 deposited (500 Å)/III five sheets/b/rubber sheet
Laminated sheet G: rubber sheet/b/(III/b/A1 deposited) four sheets/III/b/rubber sheet
Laminated sheet H: rubber sheet/IV/rubber sheet FIGS. 6 and 7 are cross-sectional views of a portion of the above laminated sheets F and G, respectively, in which a metal deposited film 26 has been interposed between layers as described above.

The laminated sheet F of FIG. 6 from top to bottom is comprised of rubber sheet 21; protective film b 23; A1 deposited (500 Å) 26; five PVA films (III) 20; protective film b 23; and rubber sheet 21. Adhesive between the layers is shown at 10.

FIG. 7 shows laminated sheet G comprised from top to bottom of rubber sheet 21; protective film b 23; four sheets comprised of a laminate of PVA film (III) 20, protective film b 23 and A1 deposited; PVA film (III) 20; protective film b 23; and rubber sheet 21.

Each of the above laminated sheets A to H was measured for the following properties:

Ratio of transmission coefficient: A ratio of transmission was measured on the basis of nitrogen gas transmission ratio of rubber sheet only being set to 1.00.

Elongation after fracture: The elongation was measured on the basis of fracture of the film layer or the rubber sheet layer at the temperature of −40° C. (310% for the rubber sheet).

Average number of fractures I: The average number of fractures up to complete breakage when elongation was accomplished from 0% to 25% at −40° C. and 2 cycles per second.

Average number of fractures II: After the sample was maintained at 80° C. for 70 hours, the average number of fractures I was measured.

The results are shown in Table 1. It is to be noted that the laminted sheet H is one for comparison.

TABLE 1

| Laminated Sheets | Ratio of Transmission Coefficient | Elongation after Fracture | Average Number of Fractures ($\times 10^4$) | |
|---|---|---|---|---|
| | | | I | II |
| A | 0.23 | 150 | 10 | 3 |
| B | 0.25 | 160 | 12 | 9 |
| C | 0.28 | 260 | 20 | 12 |
| D | 0.20 | 280 | 20 | 18 |
| E | 0.24 | 170 | 15 | 13 |
| F | 0.09 | 320 | >30 | >30 |
| G | 0.05 | 330 | >30 | >30 |
| H | 0.17 | 100 | 3 | 1 |

What is claimed is:

1. An accumulator comprising:
a shell; and
a bladder in the shell dividing the shell into a gas chamber and a fluid inflow chamber, the bladder being a cold-resistant and gas-barrier laminated sheet comprising,
a polyvinyl alcohol resin film containing a polyol type plasticizer in an amount ranging from 15% to 50% by weight, the polyvinyl alcohol resin film being comprised of a material selected from the group consisting of a completely saponified polyvinyl acetate and a partially saponified polyvinyl acetate,
a first rubber sheet layer, and
a first non-vapor and non-plasticizer-permeable resin film interposed between the polyvinyl alcohol resin film and the first rubber sheet.

2. The accumulator as claimed in claim 1 and further comprising:
a metal-deposited film laminated on one side of the first non-vapor- and nonplasticizer-permeable resin film so that the metal-deposited film faces the polyvinyl alcohol resin film.

3. An accumulator as claimed in claim 2 wherein: the first non-vapor- and non-plasticizer permeable resin film is a film of material selected from the group consisting of polyethylene, polypropylene, polyvinyl fluoride, polyvinylidene fluoride, ethylene tetrafluoride-propylene hexafluoride copolymer, and plasticizer-free and sapnofied ethylene-vinyl acetate copolymer.

4. An accumulator as claimed in claim 3 wherein:
the polyvinyl alcohol resin film comprises a multi-layer structure.

5. The accumulator as claimed in claim 1 wherein:
the polyvinyl alcohol resin film has a multi-layer structure.

6. The accumulator as claimed in claim 5, wherein:
the shell has a gas inlet;
a plug is disposed in said gas inlet;
a holder is provided for mounting the bladder on the inside of the shell;
a port member is mounted on the shell;
a fluid conduit is provided in the port member communicating with the fluid inflow chamber; and
a poppet is attached to a central portion of the bladder for closing and opening the fluid conduit.

7. An accumulator as claimed in claim 5 and further comprising:
a second non-vapor- and non-plasticizer-permeable resin film laminated on the polyvinyl alcohol resin film so that the laminations are arranged in the order of the first rubber sheet layer, the first non-vapor- and non-plasticizer-permeable resin film, the polyvinyl alcohol resin film and the second non-vapor- and non-plasticizer-permeable resin film;
the first and second non-vapor- and non-plasticizer permeable resin films being comprised of materials selected from the group consisting of polyethylene, polypropylene, polyvinyl fluoride, polyvinylidene fluoride, ethylene tetrafluoride-propylene hexafluoride copolymer, and plasticizer-free, saponified ethylene-vinyl acetate copolymer.

8. An accumulator as claimed in claim 7 wherein:
the polyvinyl alcohol resin film comprises a multi-layer structure.

9. A cold-resistant and gas-barrier laminated sheet for a bladder of an accumulator comprising:
a polyvinyl alcohol resin film containing a polyol type plasticizer in an amount ranging from 15% to 50% by weight, the polyvinyl alcohol resin film being comprised of a material selected from the group consisting of a completely saponified polyvinyl acetate and partially saponified polyvinyl acetate;
a first rubber sheet layer;
a first non-vapor and non-plasticizer permeable resin film interposed between said polyvinyl alcohol resin film and said first rubber sheet;

a second non-vapor and non-plasticizer permeable resin film laminated on said polyvinyl alcohol resin film; and a second rubber sheet layer laminated on said second non-vapor and non-plasticizer permeable resin film, so that said laminations are arranged in the order of said first rubber sheet layer, said first non-vapor and non-plasticizer permeable resin film, said polyvinyl alcohol resin film, said second non-vapor and non-plasticizer permeable resin film and said second rubber sheet layer.

10. The cold-resistant and gas-barrier laminated sheet as claimed in claim 9, wherein:

the polyvinyl alcohol resin film is comprised of a material selected from the group consisting of a completely saponified polyvinyl acetate and a partially saponified polyvinyl acetate; and the first and second non-vapor- and non-plasticizer permeable resin films are comprised of materials selected from the group consisting of polyethylene, polypropylene, polyvinyl fluoride, polyvinylidene fluoride, ethylene tetrafluoride-propylene hexafluoride copolymer, and plasticizer-free, saponified ethylene-vinyl acetate copolymer.

11. The cold-resistant and gas-barrier laminated sheet as claimed in claim 10, wherein the polyvinyl alcohol resin film comprises a multi-layer structure.

12. The cold-resistant and gas-barrier laminated sheet as claimed in claim 9, wherein the polyvinyl alcohol resin film is comprised of a multi-layer structure.

* * * * *